June 9, 1953     V. A. HEDBERG, JR     2,641,489
COUPLING CONSTRUCTION

Filed Sept. 15, 1949     2 Sheets—Sheet 1

INVENTOR
Victor A. Hedberg Jr.
BY H. F. Johnston
ATTORNEY

June 9, 1953  V. A. HEDBERG, JR  2,641,489
COUPLING CONSTRUCTION

Filed Sept. 15, 1949  2 Sheets-Sheet 2

INVENTOR
Victor A. Hedberg Jr.
BY H. F. Johnston
ATTORNEY

Patented June 9, 1953

2,641,489

UNITED STATES PATENT OFFICE 2,641,489

COUPLING CONSTRUCTION

Victor A. Hedberg, Jr., Waterbury, Conn., assignor to Scovill Manufacturing Company, Waterbury, Conn., a corporation of Connecticut Application September 15, 1949, Serial No. 115,810

1 Claim. (Cl. 285—166)

This invention relates to couplings for threadless ductile pipe, tubes, hollow conduits of metal or suitable plastic material hereinafter referred to as pipe.

My invention may be regarded as an improved coupling which grips about a pipe at a point removed from the pipe end without causing any concentrated distortion of the gripped portion of the pipe such as would weaken the pipe structure. This object is accomplished by the use of a deformable sleeve having an exterior conical surface with an intermediate projecting rib, the latter serving to distort inwardly and circumferentially a relatively large mid portion of the sleeve about the pipe to obtain a satisfactory and secure grip thereon. The fact that a relatively large mid portion of the sleeve is distorted inwardly to grip about the pipe will therefore produce an extended gripping area lengthwise of the pipe as a means to resist loosening by vibration. Furthermore, this type of bearing on the pipe allows the sleeve to move endwise along the pipe during the deforming operation instead of digging into the pipe and locking solidly. For this reason my improved fitting may be taken apart and satisfactorily made up again many more times than prior structures. The concentrated bearing of the rib against the interior conical surface of the body of the fitting provides a more reliable seal than would be the case if the sleeve bearing were continuous along the conical surface.

One object of this invention is to provide an improved coupling having the advantages of a compression coupling in that no special preforming of the pipe is required before the coupling assembly, and at the same time having great security against leakage and pulling forces on the pipe by clamping the formed end of the pipe against a cone, which pipe end is deformed coincident with the coupling assembly.

Another object of the invention is to provide such a coupling which will resist damage due to long periods of vibration.

Another object is to provide an improved coupling which will make a satisfactory leak-proof joint even though the pipe may not be of the specified accurate size or even though the end of the pipe is not cut perfectly. It is common practice in cutting pipe to use a roll cutter, for example, which leaves a burr on the inside of the pipe, and in some forms of couplings unless this burr is removed by an additional operation the coupling will not operate. With my improved coupling it is unnecessary to remove the burr formed by a roll cutter.

My improved coupling also while showing to best advantage in heavy duty and difficult applications is adaptable to lighter uses and even to plastic tubings.

In experience with self-flaring fittings it has been found under many conditions the coupling sleeve will slip along the pipe and not perform its necessary function of gripping about the pipe and urging it forwardly to form the flare along the cone. In one embodiment it is an important object of my invention to avoid this defect while securing the advantages of a flared coupling.

In my improved coupling the pipe is inserted to its final position and no substantial forward movement of the pipe is required in making up the coupling.

The full nature of this invention along with other objects and various advantages thereof will be more apparent from a consideration of the following description when read in connection with the accompanying drawing in which, Fig. 1 is a vertical section through a coupling construction embodying my invention as it appears with the parts in position for the coupling to be made up.

Figure 1:
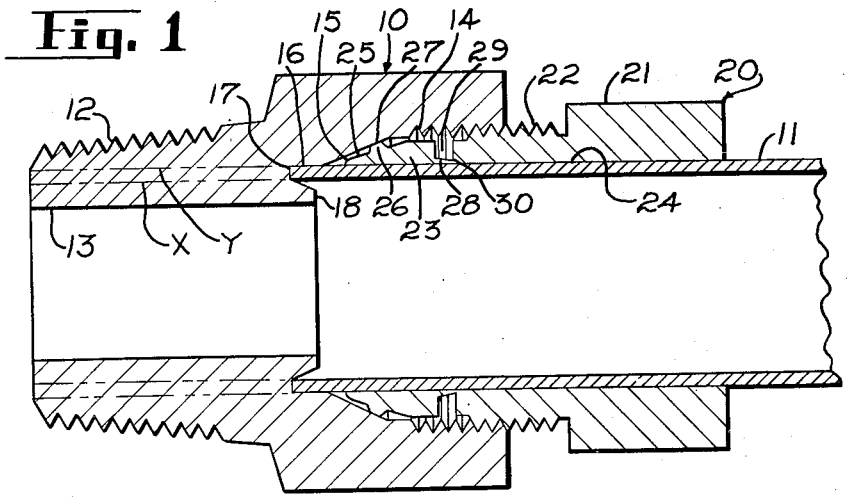

Generally speaking the foregoing objects are obtained by the use of a coupling sleeve of generally conical shape with an exterior rib, and which sleeve is forced into a conical walled recess of the coupling body by movement of the nut so as to neck the pipe inwardly adjacent its end. In one embodiment the sleeve serves to clamp the end of the pipe against a conical projection to lock the pipe securely in place. In other embodiments the end of the pipe may merely abut against a conical shoulder in the body of the coupling or it may even pass completely through the coupling.

Referring now to the drawing in which like reference numerals denote like parts throughout the several views, the numeral 10 designates a coupling member to which the end of a piece of tubing or pipe 11 is to be attached, this coupling member being usually referred to as a body. The body member may be provided with a threaded projection 12 for convenient attachment to a device to which the tube is to be connected and is provided with a central bore 13 through which any fluid may pass. The opposite end of the body member is formed with an interior threaded section 14 inwardly of which is a conical walled surface 15 that joins into a cylindrical recess 16 terminating in a base 17. From the base 17 of the cylindrical recess 16 projects a conical nipple 18 that extends into the bore of the pipe 11 when the end of the pipe is put in place against the base 17 of the recess 16.

The other part of the coupling member, generally known as the nut member 20, comprises a hexagonal section 21 to which a wrench may be applied in manipulating the coupling. Forwardly of the section 21 is an exterior threaded male section 22 adapted to fit into the threaded section 14 of the body for drawing the two members 10 and 20 axially together. Integrally connected to the forward end of the male section 22 is a deformable sleeve or ferrule 23. The sleeve 23, male section 22, and hexagonal section 21 are provided with a common bore 24 through which the tube 11 may be easily inserted. The deformable sleeve 23 is provided with an exterior conical surface 25 that preferably is formed on an angle relative to the coupling axis less than the angle of the conical walled surface 15 of the body, for reasons to be given later.

The sleeve 23, intermediate the ends of its conical surface 25, is provided with a circumferentially projecting rib 26 that is formed with a flattened top or apex surface 27 disposed on an angle substantially equal to that of the conical surface 25.

In order to make it convenient to handle the nut 20 and the deformable sleeve 23 as a unit, the two are preferably joined by a frangible web 28 made by a surrounding cut 29 between the ferrule 23 and male section 22. The exterior surface of the web 28 is preferably cut on a slight angle so as to have its weakest portion adjacent the male section as at 30.

Figure 2:
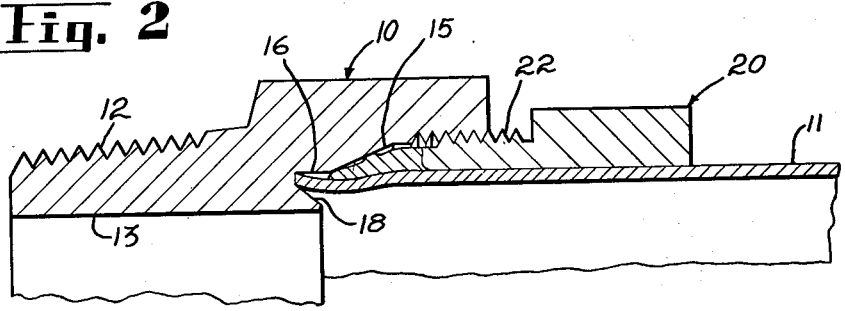
Fig. 2 is a similar view of a portion of the coupling showing the members partially united to effect a preliminary grip upon the pipe.
Figure 3:
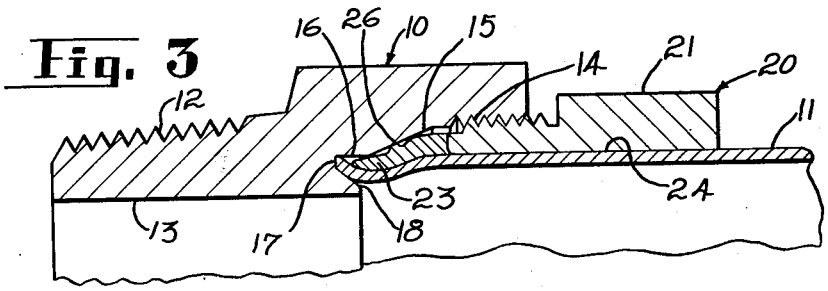
Fig. 3 is a similar view showing the coupling as it appears in its final assembled state with the end of the pipe firmly locked in place.
Figure 4:
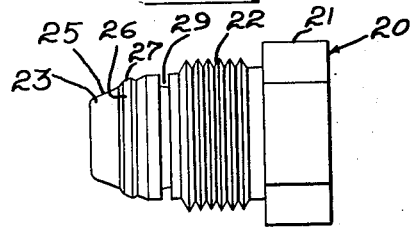
Fig. 4 is an elevational view of the nut member and integral sleeve.

In the assembly of the body and nut members, the nut 20 may be first partially threaded into the body 10 as shown in Fig. 1 so as to hold the coupling parts together as a unit. With the parts so assembled the tube or pipe 11 is next inserted through the common bore 24 of the nut member to a position where its leading end will seat against the base 17 of the cylindrical recess 16 adjacent the conical nipple 18. With the pipe 11 thus positioned the nut 20 may be turned relative to the body 10 to a position where the apex surface 27 of the rib 26 will engage the conical walled surface 15 of the body member, whereupon the sleeve 23 will momentarily stop advancing while further movement of the nut 20 will cause the frangible web 28 to break and it may either telescope slightly underneath the leading end of the male section 22 or collapse between the adjacent surface of the section 22 and the sleeve 23 or do both. With the adjacent ends of the sleeve 23 and male section 22 abutted together the sleeve 23 will be forced inwardly into the body conical walled surface 15 with the main compression forces imposed upon the projecting rib 26 such that a considerable area of the central portion of said sleeve will be deformed radially inwardly and likewise distort an extended area of the pipe inwardly to effect an embracing grip thereabout in a manner such as shown in Fig. 2. The relative thicknesses of the sleeve in the vicinity of the rib and the end portion are such that no biting into the tube occurs during the initial forming. As noted in Figs. 2 and 6 the end of the sleeve will also strike the conical wall surface 15 of the body 10 either coincident with or slightly after the rib 27 strikes that surface. The result is an inward deforming of this entire end area and a guiding of the sleeve along the tube for a considerable distance and finally the end of the sleeve clamps the end of the tube firmly against the conical nipple 18 in the case of Figs. 1 to 4 and against the conical shoulder 17a in the case of Figs. 5 and 6. This inward movement of the sleeve along the pipe results in an easier torque action, especially since the bearing against the conical wall is localized. Furthermore, there is obtained a secure grip over a considerable area of the pipe. Because of the difference in slope between the conical wall surface of the body and the taper of the sleeve the end of the sleeve can engage the conical surface before the portion behind the rib will strike the conical wall of the body. Further advancement of the nut unit will force the sleeve 23 deeper into the cylindrical recess 16 to a position where the leading end of the sleeve will engage the tube and force it solidly against the conical nipple 18 in the manner of a vise grip. This securely locks the tube in place against endwise slipping even on application of severe pulling forces on the pipe.

Figure 5:
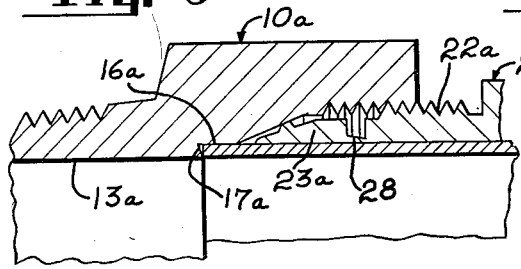
Fig. 5 is a sectional portional view of a modified form of coupling with the parts ready to be made up.
Figure 6:
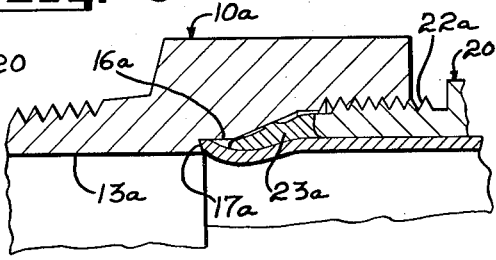
Fig. 6 is a similar view showing the above coupling as it appears when completely assembled or made up.

Figs. 5 and 6 illustrate a modified form of coupling in consisting of a body member 10a, a nut member 20a having the usual male threaded section 22a, and deformable sleeve 23a connected to the male section 22a by a frangible web 28a. The difference between this coupling and the first form, is that the opening 13 is bored out to a large size along the dots-and-dash line $x$ in Fig. 1 to the size of the opening 13a shown in Fig. 5. By this construction it will be noted that the nipple 18 is eliminated. The base 17a, however, at the inner end of the cylindrical recess 16a is cut on an angle of approximately 10 degrees, which has considerable advantage in making a coupling connection particularly when the cut end of a pipe may be somewhat mutilated, in that this slight angular form for the base will tend to cause the tip end of the pipe to form outwardly and somewhat reform the pipe end to effect a better seal at this point. As seen in Fig. 6 the conical seat 17a hooks over the end of the pipe to prevent it from bending into the bore of the fitting. The principal advantage of this coupling is that it allows for unrestricted flow through the body of the coupling, and while it lacks the positive locking feature of Figs. 1 to 3, it does provide a firm leakproof grip over a wide area of the pipe, safe against vibration and all but the most severe pulling stresses. The same effective seal between the rib and conical wall surface of the body is also a feature of this form of coupling.

Figure 7:
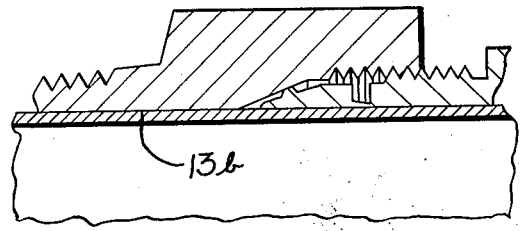
Fig. 7 is a sectional portional view similar to Fig. 5 of a further modified form of coupling which permits the pipe to pass completely therethrough.
Figure 8:
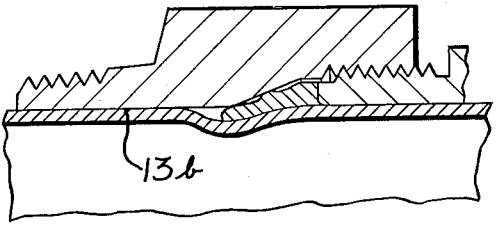
Fig. 8 is a similar view showing the above coupling as it appears when completely assembled.

Figs. 7 and 8 illustrate a further modified form of coupling which allows the pipe to pass completely through the coupling unit. In this form the opening 13b is bored to a larger size such as taken along the dotted line Y in Fig. 1, and thus eliminating both the base 17 and the nipple 18. Otherwise the coupling will function in the same manner as the second form of Figs. 5 and 6 to effect a tight wide area grip about the pipe.

It will be obvious from the above description of the second and third forms that the same tools can be employed to make these modified couplings, and only requiring different size bore drills comparable to the bore hole sizes as represented by the lines x and y in Fig. 1.

Figure 9:
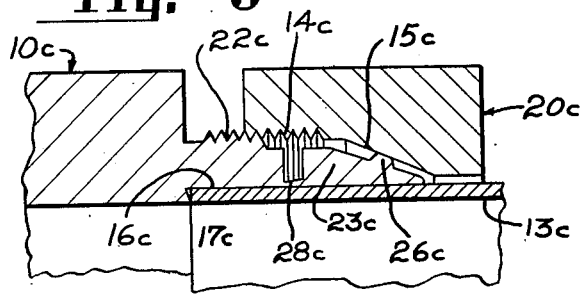
Fig. 9 is a sectional portional view similar to Fig. 5 of a still further modified form of coupling where the order of the male and female parts of the coupling are reversed.

In Fig. 9 another form of construction is shown, wherein the male part of the coupling is on the body member 10c and female part is on the nut member 20c. Specifically the body member 10c is formed with the male threaded section 22c to which is attached the deformable sleeve 23c by a frangible web 28c. The nut member 20c is provided with the female thread 14c and conical walled surface 15c against which the circumferential rib 26c of the deformable sleeve 23c engages in collapsing said sleeve about the pipe 13c.

The body member 10c in this form is shown with the recess 16c terminating in an angular formed base 17c similar to the compression form of coupling of Figs. 5 and 6. It should be understood that the nipple type of coupling as represented by Fig. 1 as well as the through type of coupling as represented by Fig. 7 can also be incorporated into the type of coupling as represented by Fig. 9.

One of the important functions of the exterior rib 26 on the deformable sleeve is that is initially presents only a relatively small surface contact against the conical walled surface 15 of the body 10 to measurably cut down on the torque factor in attempting to force the parts together in assembled relationship. This is important particularly where speed is required in making the assembly and thus lessening the exertion on the part of the operator. Furthermore, this rib 26 serves to distort the center portion of the sleeve inwardly so as to cause an extended length of the interior of said sleeve to bow inwardly to a sufficient extent to get a leakproof grip upon a substantial area of the pipe. This results in greatly increased resistance to loosening and leakage when subjected to vibration. Another advantage of my improved coupling as compared to other compression couplings is that it can be successfully taken apart and put together repeatedly without leakage. Here again the rib is an advantage because it allows more room for continued deformation after first being made up.

While the disclosure herein shows the sleeve 22 to be connected as an integral part of the nut it is also within the purview of the invention to make them as separate parts by the elimination of the frangible web 28.

While I have herein shown and described several preferred embodiments of the invention, it is to be understood that the construction may be varied as to mechanical details without departing from the spirit of invention and the scope of what is claimed.

I claim:

In a pipe coupling for threadless unflared pipe, a body member having a cylindrical bore of such diameter as to fit over the end of the pipe, an interior conical shoulder projecting into the inner end of said cylindrical bore and against which the end of the pipe to be coupled may be abutted, a nut surrounding the pipe for threaded connection with the body, a coupling sleeve having a smooth internal bore to fit around the pipe in advance of the nut, the forward portion of said sleeve being generally conical, a circumferential rib projecting outwardly from the intermediate part of said conical forward portion, said body member having an interior sloping wall against which the rib and leading end of said sleeve engage when the nut is threaded into the body with the forward end of the nut in abutting relation with the adjacent end of the sleeve, the angle of slope of said conical wall being greater than the angle of taper of the sleeve whereby upon continued threading of the nut the sleeve is deformed inwardly in the vicinity of the rib and forward end portion, thus necking the pipe inwardly while the sleeve is moving axially on the pipe and the end of the pipe is being forced firmly against said conical shoulder, which shoulder serves as an anchor to prevent the end of the pipe from collapsing inwardly, said sleeve and rib consisting of metal of substantially the same hardness as said nut whereby said rib still projects above the surface of the sleeve after the sleeve and pipe have been deformed inwardly.

VICTOR A. HEDBERG, JR.

References Cited in the file of this patent

UNITED STATES PATENTS

| Number | Name | Date |
|---|---|---|
| Re. 14,077 | Hall | Feb. 29, 1916 |
| 1,186,813 | McFerran | June 13, 1916 |
| 1,755,210 | Dohner | Apr. 22, 1930 |
| 2,211,856 | Kreidel | Aug. 20, 1940 |
| 2,287,889 | Krumsiek et al. | June 30, 1942 |
| 2,455,667 | Frank | Dec. 7, 1948 |
| 2,466,317 | Kane | Apr. 5, 1949 |
| 2,497,274 | Richardson | Feb. 14, 1950 |